United States Patent
Yada et al.

(10) Patent No.: US 7,664,290 B2
(45) Date of Patent: Feb. 16, 2010

(54) IMAGE PROCESSOR, IMAGE PROCESSING METHOD, AND STORAGE MEDIUM STORING PROGRAM FOR THE COMBINING OF CODED IMAGES INTO PRINT IMAGES

(75) Inventors: Shinichi Yada, Nakai-machi (JP); Hirofumi Komatsubara, Nakai-machi (JP); Junichi Matsunoshita, Nakai-machi (JP); Takeshi Noguchi, Nakai-machi (JP); Hajime Sugino, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 818 days.

(21) Appl. No.: 11/067,633

(22) Filed: Feb. 28, 2005

(65) Prior Publication Data

US 2006/0017949 A1    Jan. 26, 2006

(30) Foreign Application Priority Data

Jul. 21, 2004    (JP)    ............................. 2004-213559

(51) Int. Cl.
*G06K 9/00*    (2006.01)
(52) U.S. Cl. ........................ 382/100; 358/3.28; 713/176
(58) Field of Classification Search .................. 382/100; 358/3.28; 713/176–179
See application file for complete search history.

(56) References Cited

U.S. PATENT DOCUMENTS

| | | | |
|---|---|---|---|
| 6,123,258 A | 9/2000 | Iida | |
| 6,285,776 B1 * | 9/2001 | Rhoads | 382/100 |
| 6,334,187 B1 * | 12/2001 | Kadono | 713/176 |
| 6,643,414 B1 * | 11/2003 | Kadono | 382/291 |
| 6,658,135 B1 * | 12/2003 | Morito et al. | 382/100 |
| 6,738,495 B2 * | 5/2004 | Rhoads et al. | 382/100 |
| 6,782,509 B1 * | 8/2004 | Hirayama et al. | 715/210 |

(Continued)

FOREIGN PATENT DOCUMENTS

JP    A-11-3353    1/1999

(Continued)

OTHER PUBLICATIONS

K. Matsui; Basic Digital Watermark—New Protect Technology for Multimedia; Morikita Shuppan Co., Ltd.; pp. 16-21 Aug. 1998. English Language translation of p. 19, line 1—p. 21, line 3 attached.

*Primary Examiner*—Bhavesh M Mehta
*Assistant Examiner*—Sean Motsinger
(74) *Attorney, Agent, or Firm*—Oliff & Berridge, PLC (57) ABSTRACT

An image processor for combining a computer-readable coded image into a print image of a document including a document data main body and at least one associated data piece, has a print image generator that generates a print image of a document including an image of at least a part of the associated data, a coded image generator that generates a coded image to be combined into the print image, and a controller that determines whether or not the generated coded image can be combined into the image portion of the associated data by comparing a size of the generated coded image with a size of an image portion of the associated data, and combines the generated coded image into the image portion of the associated data on the generated print image, if it is determined that combining is possible.

10 Claims, 4 Drawing Sheets

U.S. PATENT DOCUMENTS

| | | | |
|---|---|---|---|
| 6,954,542 B2 * | 10/2005 | Miyake et al. | 382/100 |
| 7,006,658 B2 * | 2/2006 | Epstein | 382/100 |
| 7,043,050 B2 * | 5/2006 | Yuval | 382/100 |
| 7,154,638 B1 * | 12/2006 | Lapstun et al. | 358/3.28 |
| 7,184,571 B2 * | 2/2007 | Wang et al. | 382/100 |
| 7,253,917 B2 | 8/2007 | Umeda et al. | |
| 7,386,149 B2 * | 6/2008 | Eguchi et al. | 382/100 |
| 7,400,727 B2 * | 7/2008 | Kadono | 380/203 |
| 7,444,036 B2 | 10/2008 | Matsunoshita et al. | |
| 2002/0076081 A1 * | 6/2002 | Rhoads | 382/100 |
| 2002/0191216 A1 * | 12/2002 | Umeda et al. | 358/1.15 |
| 2006/0126891 A1 * | 6/2006 | Seroussi et al. | 382/100 |

FOREIGN PATENT DOCUMENTS

| | | |
|---|---|---|
| JP | A-2000-358154 | 12/2000 |
| JP | A-2001-186331 | 7/2001 |
| JP | A-2002-215466 | 8/2002 |
| JP | A-2003-110841 | 4/2003 |
| JP | A-2004-050722 | 2/2004 |
| JP | A-2006-033754 | 2/2006 |
| JP | A-2006-033756 | 2/2006 |

* cited by examiner

IMAGE PROCESSOR, IMAGE PROCESSING METHOD, AND STORAGE MEDIUM STORING PROGRAM FOR THE COMBINING OF CODED IMAGES INTO PRINT IMAGES

BACKGROUND OF THE INVENTION

1. Field of the Invention

The present invention relates to image processor for combining a coded image into a print image.

2. Description of the Related Art

In recent years, a technique of combining a coded image obtained by coding data into an image (subject image) to be displayed or printed, then extracting the coded image on the decoding side, then decoding the data from the coded image and utilizing the data, has been developed.

Figure 8:
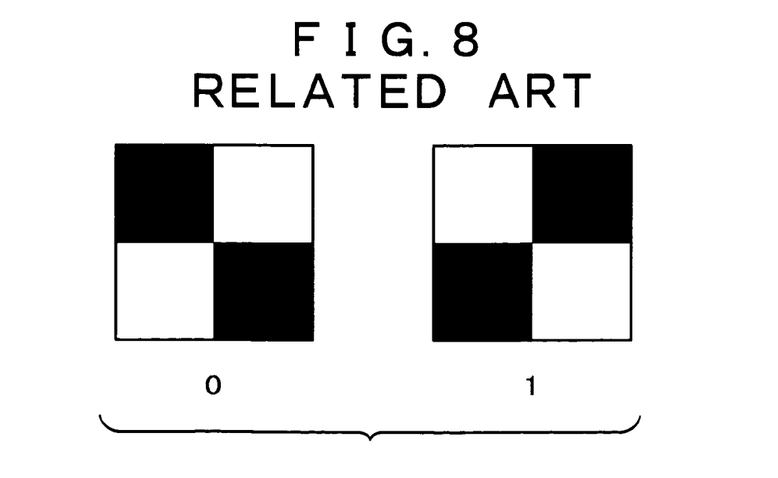
FIG. 8 is an explanatory diagram showing an example of image elements of general coded image in the related art.

According to this technique, the coded image, in a so-called semi-transparent state, is combined into the image to be printed, while the visibility of the subject image is maintained. More particularly, as shown in FIG. 8, coded image elements corresponding to "0" and "1" bits are arrayed in accordance with the data to be coded, and the brightness of pixels of the subject image is reduced by a value obtained by multiplying the pixel brightness of the coded image by a predetermined value. Among the pixels of the coded image elements in FIG. 8, the brightness of "white" pixel is "0", and the brightness of "black" pixel is "255".

Generally, as in the above-described coded image combining, a coded image is combined in an area which satisfies predetermined conditions in a subject image. However, detection of such an area causes a heavy load, and further, the subject image does not always include an appropriate area satisfying the conditions. Accordingly, in the conventional coded image combining techniques, the processing is comparatively complicated.

For example, as in the case of PDF (Portable Document Format), in a case where annotation information is linked to a document as if the information were a so-called "tag", and the annotation information can be printed with the document, the annotation information is usually an image comparatively appropriate for coded image combining (e.g., a character string is described on a colored background). Accordingly, a coded image may be combined with the image of the annotation information.

However, since there are various sizes of annotation information images whereas the size of data to be included in the coded image is not constant, the entire coded image cannot always be combined in the annotation information image.

SUMMARY OF THE INVENTION

The present invention has been made in consideration of the above situation, and provides image processor for combining of coded image even when the entire coded image cannot be combined in the image of annotation information as described above.

To address the above-described problem of the related art, an aspect of the present invention provides an image processor for combining a computer-readable coded image into a print image of a document including a document data main body and at least one associated data piece, including: a print image generator that generates a print image of a document including an image of at least a part of the associated data, a coded image generator that generates a coded image to be combined into the print image, and a controller that determines whether or not the generated coded image can be combined into the image portion of the associated data by comparing a size of the generated coded image with a size of an image portion of the associated data, and combines the generated coded image into the image portion of the associated data on the generated print image, if it is determined that combining is possible.

BRIEF DESCRIPTION OF THE DRAWINGS

Embodiments of the present invention will be described in detail based on the following figures, wherein.

DETAILED DESCRIPTION OF THE INVENTION

Figure 1:
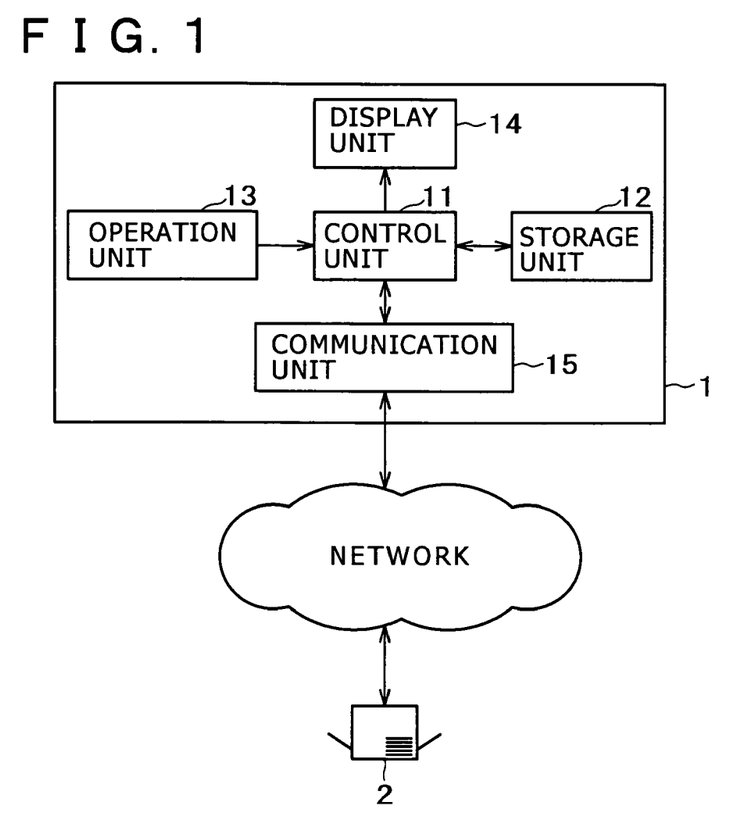
FIG. 1 is a block diagram showing an example of an image processor according to an embodiment of the present invention.

Hereinbelow, embodiments of the present invention will be described in accordance with the accompanying drawings. As shown in FIG. 1, an image processor 1 according to an embodiment has a control unit 11, a storage unit 12, an operation unit 13, a display unit 14 and a communication unit 15. Further, the image processor 1 is connected to a printer 2 as an image forming apparatus via a network.

The control unit 11, having a CPU or the like, operates in accordance with a program stored in the storage unit 12, and performs editing, display and printing of a document. Further, during print processing, the control unit 11 prints an image of associated data, linked with the document data, with the image of a document data main body. At this time, the control unit 11 selectively combines a coded image, obtained by coding data designated by a user, into an image portion of the associated data, and performs printing. The particular contents of the processing by the control unit 11 will be described in detail later.

The storage unit 12 includes a computer-readable storage medium such as a hard disk, a CD-ROM or a DVD-ROM (and a driver to control reading of data from the storage medium), as well as memory devices such as a RAM and a ROM. The hard disk or the like as the storage unit 12 holds the program executed by the control unit 11. Further, the storage unit 12 also operates as a work memory to hold data necessary for processing by the control unit 11.

The operation unit 13, including a keyboard, a mouse and the like, outputs the content of the user's instruction to the control unit 11. The display unit 14 displays an image in accordance with an instruction inputted from the control unit 11. The communication unit 15, connected to the network, transmits data to a destination on the network in accordance with an instruction inputted from the control unit 11. Further, the communication unit 15 receives data that has arrived via the network and outputs the data to the control unit 11. The communication unit 15 receives an instruction from the control unit 11 to, e.g., transmit image data as the subject of printing to the printer 2, and transmits the image data via the network to the printer 2.

The document to be subjected to processing in the image processor 1 according to the present embodiment is, e.g., a document based on the standards of the PDF (Portable Document Format) by Adobe Systems Incorporated. In the PDF format, a document may include annotation information, added as information associated with the document, in addition to data on the main body of the document (document data main body) including character strings, graphics and the like. The annotation information includes data in forms of character strings and graphics forming a memorandum, audio data, moving image data and the like. Note that regarding the particular structure of the annotation information, as the details are described in Adobe Systems, translated by Document System Co., Ltd. "PDF Reference Second Edition" first edition, issued by Pearson Education Japan Co., Ltd., Sep. 25, 2001, Section 7, 7.4 (P. 342 and the subsequent pages), the detailed explanation thereof will be omitted here but the outline of the structure will be described below.

Figure 2:
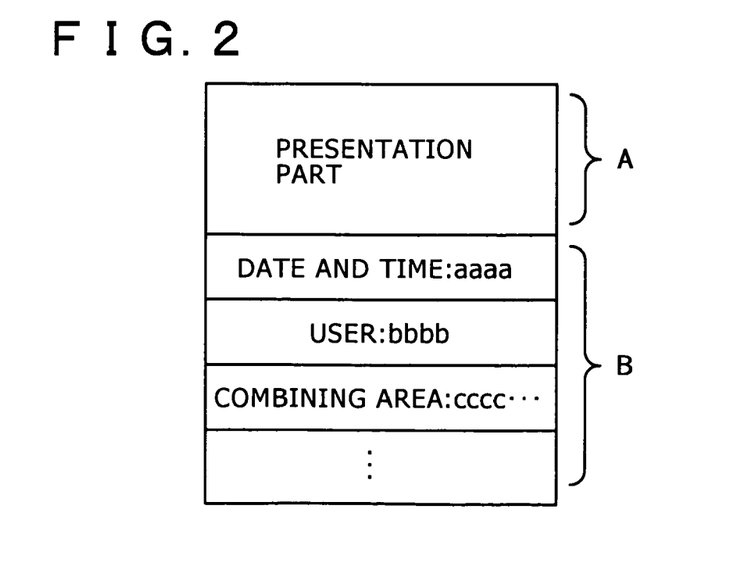
FIG. 2 is a table showing an example of associated data.

That is, the annotation information includes presentation part data A which is the original of an image to be displayed or printed and non-presentation part data B which is not directly included in the print image (FIG. 2). For example, the non-presentation part data B includes information specifying the date and time of generation of the annotation information, the user who generated the annotation information, information on an area on the document data main body where the annotation information is combine-displayed, and the like.

The information on the area for combine-display includes, e.g., information specifying a page of the document data and information on a display area (coordinates) in the specified page.

Figure 3:
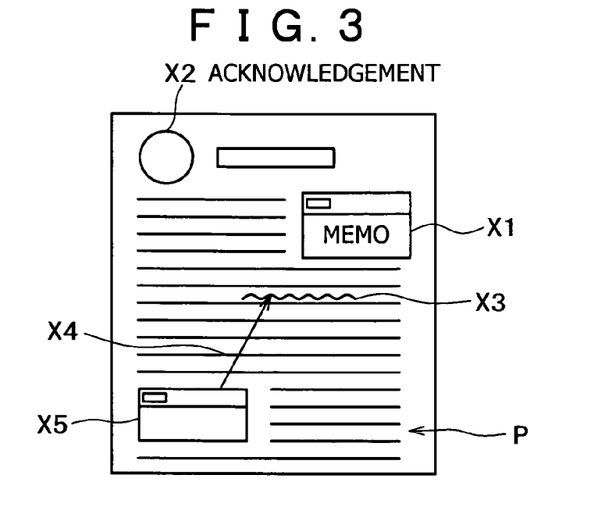
FIG. 3 illustrates an example of document display.

The control unit 11 performs editing, display and printing of such a PDF document. More particularly, in a case where a PDF document with associated annotation information is displayed and print-outputted, the control unit 11 superimposes annotations X on the image of document main body P as shown in FIG. 3, and performs display and printing as if "tags" were attached to the document. The annotation information includes display setting information to determine whether or not a presentation part of the annotation information is to be displayed as one of non-presentation part data pieces. The control unit 11 refers to the display setting information, and displays a presentation part of the annotation information if the information indicates that the presentation part is to be displayed. Further, the control unit 11 does not display a presentation part of the annotation information if the display setting information indicates that the presentation part is not to be displayed.

Figure 4:
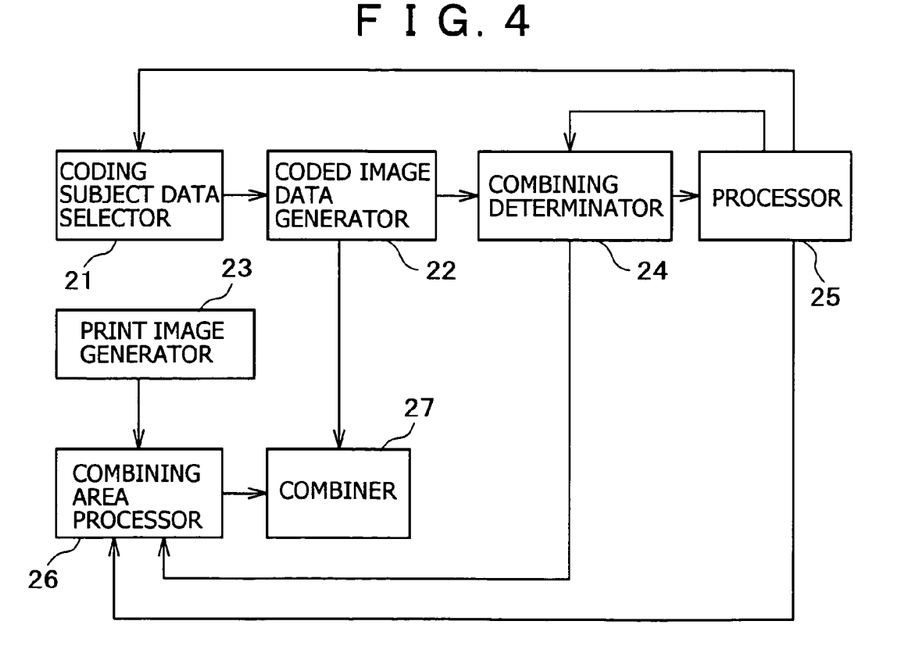
FIG. 4 is a functional block diagram showing an example of processing in the image processor according to the embodiment of the present invention.

Next, the contents of processing executed by the control unit 11 upon reception of document print instruction from the user will be described. As shown in FIG. 4, the processing functionally includes a coding subject data selector 21, a coded image data generator 22, a print image generator 23, a combining determinator 24, a processor 25, a combining area processor 26 and a combiner 27.

In accordance with the user's designation of data to be subjected to coding (coding subject data), the coding subject data selector 21 outputs the designated data as coding subject data to the coded image data generator 22.

The designation of coding subject data may be performed by inputting data from the operation unit 13. Further, at least a part of non-presentation part data included in annotation information may be designated as coding subject data. It may be arranged such that if plural annotation information pieces are associated with a document, the user selectively designates a part of the plural annotations and only the selected annotation information is handled as coding subject data.

Further, in the annotation information pieces, annotation information to be printed (the display setting information indicates that the annotation information is to be displayed) may be designated as coding subject data. In this case, the setting "to be displayed" corresponds to designation of coding subject data.

The coded image data generator 22 receives the coding subject data from the coding subject data selector 21, and generates coded image data corresponding to the respective coding subject data pieces based on the input coding subject data. As the generation of coded image data is similar to that in the related art, the explanation thereof will be omitted. In a case where annotation information is handled as coding subject data, it may be arranged such that non-presentation part data is extracted from the annotation information and coded. The coded image data is generated based on the extracted non-presentation part data.

The print image generator 23 generates image data of a document data main body (main body image data). Further, the print image generator 23 generates an image of annotation information, the setting of which is "to be displayed" (an image generated based on a presentation part). The print image generator 23 combines images of respective annotation information pieces in combining areas for the respective annotation information pieces on the main body image data, and outputs the image data after combining of the annotation information as print image data.

The combining determinator 24 compares the image size of the coded image data with the size of combining area, and if the image size of the coded image data is equal to or smaller than the size of the combining area, determines that combining is possible. On the other hand, if the image size of the coded image data is larger than the size of the combining area, the combining determinator 24 determines that combining is impossible.

The processor 25 adjusts at least one of the coded image data and the combining area if the combining determinator 24 has determined that combining is impossible. More particularly, the processor 25 enlarges the combining area or deletes a part of the coding subject data included in the coded image data. The processing will be described below.

First, the enlargement of the combining area will be described. In the present embodiment, as the combining area for coded image data becomes an image area of annotation information, the enlargement of the combining area equals enlargement of image of annotation information. That is, the image of annotation information in the combining area, determined as smaller than the size of coded image data to be combined, is enlarged to the size of the coded image data.

At this time, the processor 25 checks whether or not the image of annotation information after the enlargement overlaps the image of the document main body (character strings and the like) or another annotation information combining area (whether enlargement is possible or not). The checking may be made by determining whether or not the image area of the annotation information after the enlargement overlaps another combining area or an object area related to the image of the document main body.

If the processor 25 determines that the enlargement is possible (the image of the annotation information after the enlargement does not overlap the image of the document main body or another annotation information combining area), the processor 25 enlarges the image of the annotation information. The enlargement processing is similar to general enlargement of image data.

Next, the deletion of a part of coding subject data included in the coded image data will be described. As a particular example, processing in a case where coding subject data is at least a part of non-presentation part data included in annotation information will be described. The processor 25 displays a list of data included in the non-presentation part data on the display unit 14, to request the user's selection. When the user selects a part of the list, the processor 25 outputs the selected part as new coding subject data to the coded image data generator 22.

Further, the processor 25 may select a part of coding subject data based on predetermined rules. In this case, the rules are determined by data type. For example, it may be arranged such that in the case of text data, a predetermined number of characters of text is selected from the head, and image data is excluded from selection (from coding subject data).

In the present embodiment, the processing of adjustment of coding subject data or combining area is repeated until it is determined that combining is possible. Note that it may be arranged such that the processor 25 performs deletion of coding subject data when it has been determined that a combining area cannot be enlarged.

Then, when it has been determined that coded image data as the subject of combining can be combined in the combining area (including a case where combing has become possible by adjustment), the following processing by the combining area processor 26 and the combiner 27 is performed.

The combining area processor 26 extracts partial image data of an area, in which coded image data generated by the coded image data generator 22 is to be combined, from print image data generated by the print image generator 23. In the present embodiment, the area in which the coded image data is to be combined corresponds to a combining area for annotation information. Accordingly, the combining area processor 26 extracts the image in the combining area for annotation information as the base of combining.

The combining area processor 26 checks whether or not another coded image is already combined in the extracted image. If another coded image is already combined in the image of presentation part of the annotation information, further combining of the coded image (coded image generated by the coded image data generator 22) may cause interference between the coded images and disable decoding. The checking is made for prevention of this inconvenience.

If another coded image is already combined in the extracted image, the combining area processor 26 determines whether or not image data before combining of the coded image (image data of the annotation information) can be obtained. For example, in a case where the image data of the annotation information has plural layers, original image data is included in the first layer, the coded image is included in the second layer, and these image data pieces are merely combined, then the original image data included in the first layer is extracted, thereby the image data before combining of the coded image (image data of the annotation information) is obtained. If it is determined that image data before combining of the coded image can be obtained, the combining area processor 26 obtains the image data before combining of the coded image, then overwrites the obtained image data before combining, in the combining area for the annotation information in the print image data.

Further, if the combining area processor 26 determines that the image data before combining of the coded image (image data of the annotation information) cannot be obtained, the combining area processor 26 deletes the already-combined coded image from the extracted image. The deletion is performed by, e.g., decoding data from the coded image combined in the extracted image, reproducing a coded image from the decoded data, calculating the difference between the reproduced coded image and the extracted image, and deleting the coded image from the extracted image. In this case, the combining area processor 26 overwrites the image where the coded image has been deleted on the combining area for the annotation information in the print image data.

In this manner, the combining area processor 26 adjusts an image area of combining so as to exclude another coded image.

The combiner 27 combines the coded image data generated by the coded image data generator 22 in the image portion of the annotation information (area specified with the combining area), thus generates combined image data. At this time, if plural annotation information pieces exist, the combiner 27 searches for combining areas in the order of, e.g., raster scanning (left-to-right 1-line scanning of the document and then similar scanning in the lower line). The combiner 27 combines the coded image data generated by the coded image data generator 22 in the combining areas in the searched order.

Further, in a case where the coded image data generated by the coded image data generator 22 is at least a part of annotation information (e.g., a non-presentation part), the combiner 27 combines the coded image data in a combining area for the original annotation information (annotation information related to the coded image data) on the print image data. In this case, the coded image data related to the non-presentation part data of the annotation information is combined in the image of annotation information.

When the coded image data as the coding subject data has been combined by the combiner 27, the control unit 11 instructs the communication unit 15 to output the combined print image data to the printer 2. Then the printer 2 prints the combined print image data.

According to the present embodiment, in a case where a printing of a document has been designated, and coded image data generated based on a part of annotation information as associated data included in the document cannot be combined in the annotation information, the image of the annotation information as the base area of combining is enlarged, thereby the combining area is enlarged. Then the coded image data is combined in the image of the annotation information after the enlargement, and printing is performed.

The print image generated in accordance with the present embodiment is optically detected with a scanner of a decoding side apparatus. Then the combined portions of the respective coded image data pieces are specified from detected image data, and the respective coded image data pieces are decoded.

Further, the decoding side apparatus stores the decoded data, as being associated with the information indicating the combined portions (coordinate information specifying the combined portions), and performs the next processing. That is, the decoding side apparatus displays the detected image data on a display unit. When a user designates a combined portion using a mouse pointer or the like (moves a pointer to the combined portion or clicks the portion) of the image data on the display, the decoding side apparatus displays the held decoded data associated with the combined portion. Even when the user has obtained the printout, the user can refer to the data of the non-presentation parts of the respective annotation information pieces and obtain the name of a user who added the annotation information and the date and time of addition of the annotation information.

Note that in the present embodiment, the image of annotation information is enlarged, however, the enlargement may be replaced with addition of image data as the base area of combining to the print image data. In this case, the surplus portion of coded image data (the portion that cannot been combined in the image of annotation information) can be combined in the added image data (auxiliary image data).

Figure 5:
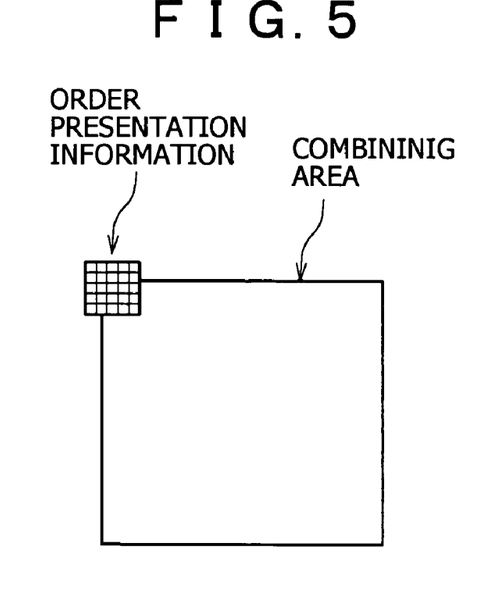
FIG. 5 is an explanatory diagram showing an example of order presentation information.

In this manner, in a case where it is determined that the entire coded image data cannot be combined, and the coded image data is divided and combined in images of annotation information and auxiliary image data, order presentation information indicating the order of combining (order of decoding) is combined in the respective images of combining areas. The order presentation information may be combined as a coded image of, e.g., a two-dimensional bar code, around (may partially overlap) the respective combining area images. More particularly, the order presentation information may be combined as shown in FIG. 5.

In the case where the coded image data is divided and combined in plural combining base areas, the decoding side apparatus decodes the respective coded image data pieces divided and combined in the plural combining base areas. Then the decoding side apparatus connects data obtained by decoding the respective coded image data pieces, in the order indicated by the order presentation information displayed adjacently to the respective combining base areas, thereby reproduces coding subject data. Note that plural auxiliary image data pieces may be used in combining. Further, the auxiliary image data may be an icon image previously determined by data type.

Figure 6:
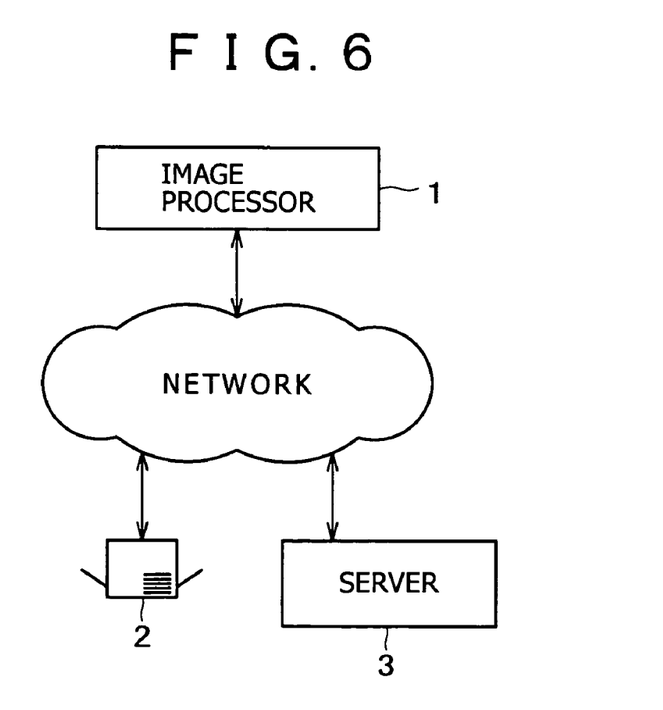
FIG. 6 is a block diagram showing an example of an image processing system according to another embodiment of the present invention.

Further, as shown in FIG. 6, an image processing system according to another embodiment of the present invention includes the image processor 1, the printer 2 and a server 3. The image processor 1 performs similar operations to those of the image processor 1 in the above-described embodiment, however, the content of processing in the processor 25 of the control unit 11 and the like are different. More particularly, the control unit 11 of this embodiment compares the size of coding subject data with a predetermined threshold value. Regarding coding subject data having a size not greater than the threshold value, even if the image size of coded image data is larger than that of a combining area, combining of the coded image data based on the coding subject data is enabled by enlargement of the combining area or deletion of a part of coding subject data as in the case of the above-described embodiment.

Figure 7:
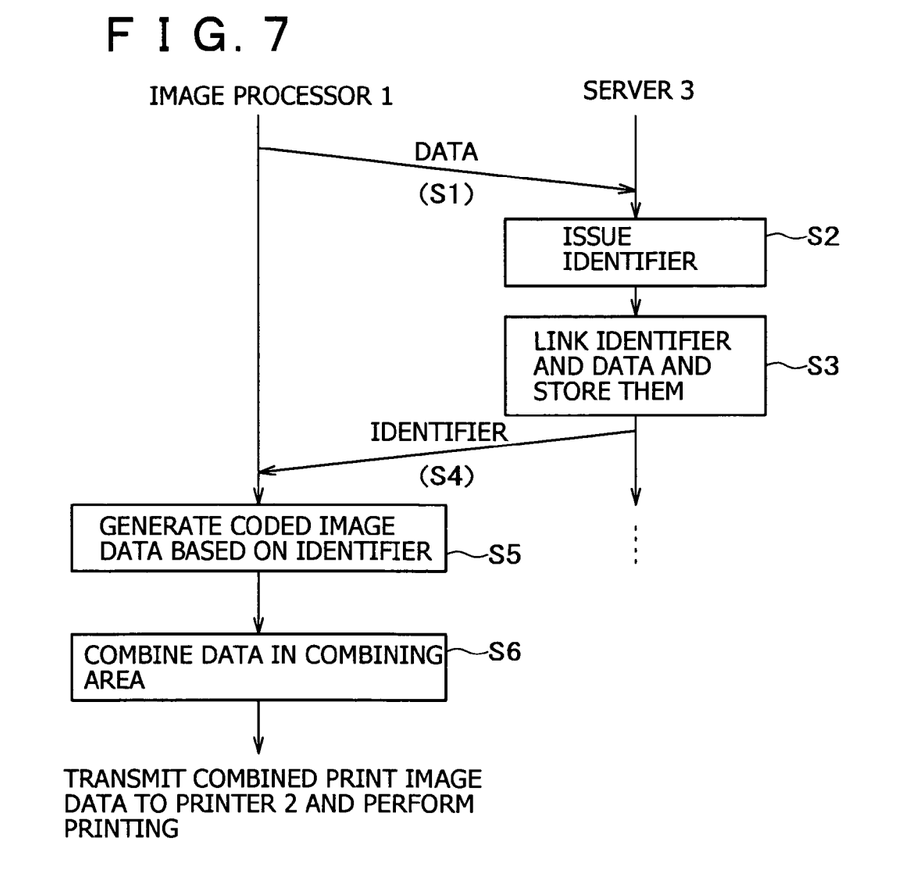
FIG. 7 is a flowchart showing an example of the operation of the image processing system according to the other embodiment of the present invention.

Further, in a case where the coding subject data is audio data or moving image data and the size of the coding subject data is greater than the predetermined threshold value, the data is transmitted to the server 3 (FIG. 7, S1). The server 3 receives the data, and issues a unique identifier (S2). The unique identifier may be, e.g., a hash value of the received data. The server 3 stores the issued identifier and the data into a storage device (not shown) (S3). Further, the server 3 transmits the issued identifier to the image processor 1 (S4).

The image processor 1 generates coded image data representing the identifier as new coding subject data (S5), and combines the data in a combining area of annotation information as the combining base area (S6). In this arrangement, if the annotation information includes audio data, the audio data is transmitted to the server 3, and an identifier issued from the server 3 is received. The coded image data is generated based on the identifier, and the coded image data is combined in the image of the annotation information.

In this case, the decoding side apparatus is connected to the network for communication with the server 3. If data obtained by decoding the coded image data combined in the image of the annotation information is identifier information, the decoding side apparatus issues a request for data associated with the identifier, with the identifier. The server 3 receives the request and the identifier, and transmits data associated with the received identifier to the decoding side apparatus. Then the decoding side apparatus displays or reproduces the data received from the server 3.

In these embodiments, the method of storing data as the subject of coding on the server 3 based on the result of comparison between the size of the coding subject data and the predetermined threshold value, and based on the identifier of the stored data, generating and combining coded image data (method of use of external device), or the method of adjusting the combining area or coding subject data (adjustment method) is adopted. However, one of these methods may be selected in correspondence with the type of coding subject data. For example, regarding audio data or moving image data, the method of use of external device may be adopted, while regarding other data, the adjustment method may be adopted.

Further, one of these methods may be adopted based on whether or not the difference between the image size of coded image data based on coding subject data and that of combining area as the combining base area is greater than a predetermined size-difference threshold value.

As described above, according to the embodiments, in a case where the entire coded image cannot be combined in the image of annotation information, processing for enabling combining can be performed.

As described above, the present invention provides an image processor for combining a computer-readable coded image into a print image of a document including a document data main body and at least one associated data piece, including: a unit that generates a print image of a document including an image of at least a part of the associated data; a coded image generation unit that generates a coded image to be combined into the print image; a determination unit that compares a size of the generated coded image with a size of an image portion of the associated data, and determines based on a result of the comparison whether or not the generated coded image can be combined into the image portion of the associated data; and a combining unit that, if the determination unit has determined that combining is possible, combines the generated coded image into the image portion of the associated data on the generated print image.

By the above determination, in a case where the entire coded image cannot be combined in the image of annotation information, processing for enabling combining may be performed. As the processing, according to an aspect of the present invention, the image processor further may include a unit that, if the determination unit has determined that combining is impossible, performs enlargement processing on the image portion of the associated data. Further, the determination unit may determine whether or not the coded image can be combined within the size of the image portion of the associated data after the enlargement processing, and if the determination unit has determined that combining is possible based on a result of determination regarding the associated data after the enlargement processing, the combining unit may combine the generated coded image into the image portion of the associated data on the generated print image.

Further, the image processor further may include a unit that, if the determination unit has determined that combining is impossible, combines at least one auxiliary image data piece previously set as data for embedding, into the print image, and the combining unit may combine the generated coded image into the image portion of the associated data and a portion of the combined auxiliary image data.

Further, if the determination unit has determined that the generated coded image cannot be combined, the coded image generation unit may selectively delete a part of information included in the coded image, and generate an adjusted coded image based on the information after the deletion, and the determination unit may determine whether or not the adjusted coded image can be combined into the image portion of the associated data.

Further, if the determination unit has determined that combining is impossible, the determination unit may select at least enlargement of the image portion of the associated data or deletion of a part of the information included in the coded image, based on the result of comparison between the size of the generated coded image and the size of the image portion of the associated data, and if the determination unit has selected the enlargement of the image portion of the associated data, the determination unit may cause the enlargement processing on the image portion of the associated data, or if the determination unit has selected the deletion of the part of the information included in the coded image, the determination unit may cause the coded image generation unit to selectively delete the of the information included in the coded image and generate an adjusted coded image based on the information after the deletion.

In these cases, each of the associated data pieces may include presentation part data as an original of an image included in the print image and non-presentation part data not included in the print image, and the coded image generation unit may generate the coded image by coding at least a part of the non-presentation part data.

Further, an image processing method according to another aspect of the present invention is an image processing method for combining a computer-readable coded image into a print image of a document including a document data main body and at least one associated data piece, including: generating a print image of a document including an image based on at least a part of the associated data; generating a coded image to be combined into the print image; comparing a size of the generated coded image with a size of an image portion of the associated data, and determining based on a result of the comparison whether or not the generated coded image can be combined into the image portion of the associated data; and if it has been determined that combining is possible, combining the generated coded image into the image portion of the associated data on the generated print image.

Further, an image processing program according to another aspect of the present invention is a computer storage medium readable by a computer, the storage medium storing a program of instructions executed by the computer to perform a function for combining a computer-readable coded image into a print image of a document including a document data main body and at least one associated data piece, the function including: generating a print image of a document including an image based on at least a part of the associated data; generating a coded image to be combined into the print image; comparing a size of the generated coded image with a size of an image portion of the associated data, and determining based on a result of the comparison whether or not the generated coded image can be combined into the image portion of the associated data; and, if it has been determined that combining is possible, combining the generated coded image into the image portion of the associated data on the generated print image.

While this invention has been described in connection with certain embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

The entire disclosure of Japanese Patent Application No. 2004-213559 filed on Jul. 21, 2004 including specification, claims, drawings and abstract is incorporated herein by reference in its entirety.

What is claimed is:

1. An image processor for combining a computer-readable coded image into a print image of a document including a document data main body and at least one associated data piece, comprising:
   a controller that generates a print image of a document including an image of at least a part of the associated data and generates a coded image to be combined into the print image, wherein:
   the controller determines whether or not the generated coded image can be combined into the image portion of the associated data by comparing a size of the generated coded image with a size of an image portion of the associated data, and combines the generated coded image into the image portion of the associated data on the generated print image, if it is determined that combining is possible;
   if the controller determines that combining is impossible, the controller selects at least enlargement of the image portion of the associated data or deletion of a part of the information included in the coded image, based on the result of comparison between the size of the generated coded image and the size of the image portion of the associated data; and
   if the controller selects the enlargement of the image portion of the associated data, the controller causes the enlargement processing on the image portion of the associated data, or
   if the controller selects the deletion of the part of the information included in the coded image, the controller selectively deletes the part of the information included in the coded image and generates an adjusted coded image based on the information after the deletion.

2. The image processor according to claim 1, wherein
   the controller combines at least one auxiliary image piece previously set as data for embedding, into the print image, if it is determined that combining is impossible, and
   combines the generated coded image into the image portion of the associated data and a portion of the combined auxiliary image data.

3. The image processor according to claim 1,
   wherein if the controller determines that the generated coded image cannot be combined, the controller selectively deletes a part of information included in the coded image, and generates an adjusted coded image based on the information after the deletion, and
   the controller determines whether or not the adjusted coded image can be combined into the image portion of the associated data.

4. The image processor according to claims 1,
   wherein each of the associated data pieces includes presentation part data as an original of an image included in the print image and non-presentation part data not included in the print image, and the controller generates the coded image by coding at least a part of the non-presentation part data.

5. An image processing method for combining a computer-readable coded image into a print image of a document including a document data main body and at least one associated data piece, comprising using a processor to perform the steps of:

generating a print image of a document including an image of at least a part of the associated data;

generating a coded image to be combined into the print image;

comparing a size of the generated coded image with a size of an image portion of the associated data, and determining based on a result of the comparison whether or not the generated coded image can be combined into the image portion of the associated data; and if it is determined that combining is possible, combining the generated coded image into the image portion of the associated data on the generated print image, if it is determined that combining is impossible, selecting at least enlargement of the image portion of the associated data or deletion of a part of the information included in the coded image, based on the result of comparison between the size of the generated coded image and the size of the image portion of the associated data, and if the enlargement of the image portion of the associated data is selected, causing the enlargement processing on the image portion of the associated data, or if the deletion of the part of the information included in the coded image is selected, causing the coded image generator to selectively delete the part of the information included in the coded image and generate an adjusted coded image based on the information after the deletion.

6. A computer storage medium readable by a computer, the storage medium storing a program of instructions executed by the computer to perform a function for combining a computer-readable coded image into a print image of a document including a document data main body and at least one associated data piece, the function comprising:

generating a print image of a document including an image of at least a part of the associated data;

generating a coded image to be combined into the print image;

comparing a size of the generated coded image with a size of an image portion of the associated data, and determining based on a result of the comparison whether or not the generated coded image can be combined into the image portion of the associated data; and if it is determined that combining is possible, combining the generated coded image into the image portion of the associated data on the generated print image, if it is determined that combining is impossible, selecting at least enlargement of the image portion of the associated data or deletion of a part of the information included in the coded image, based on the result of comparison between the size of the generated coded image and the size of the image portion of the associated data, and if the enlargement of the image portion of the associated data is selected, causing the enlargement processing on the image portion of the associated data, or if the deletion of the part of the information included in the coded image is selected, causing the coded image generator to selectively delete the part of the information included in the coded image and generate an adjusted coded image based on the information after the deletion.

7. An image processor for combining a computer-readable coded image into a print image of a document including a document data main body and at least one associated data piece, comprising:

a print image generation means for generating a print image of a document including an image of at least a part of the associated data;

a coded image generation means for generating a coded image to be combined into the print image;

a determination means for comparing a size of the generated coded image with a size of an image portion of the associated data, and determining based on a result of the comparison whether or not the generated coded image can be combined into the image portion of the associated data; and a combining means for, if the determination means determines that combining is possible, combining the generated coded image into the image portion of the associated data on the generated print image, wherein if the determination means determines that combining is impossible, the determination means selects at least enlargement of the image portion of the associated data or deletion of a part of the information included in the coded image, based on the result of comparison between the size of the generated coded image and the size of the image portion of the associated data, and if the determination means selects the enlargement of the image portion of the associated data, the determination means causes the enlargement processing on the image portion of the associated data, or if the determination means selects the deletion of the part of the information included in the coded image, the determination means causes the coded image generation means to selectively delete the part of the information included in the coded image and generate an adjusted coded image based on the information after the deletion.

8. The image processor according to claim 7, further comprising a means for, if the determination means determines that combining is impossible, combining at least one auxiliary image piece previously set as data for embedding, into the print image, wherein the combining means combines the generated coded image into the image portion of the associated data and a portion of the combined auxiliary image data.

9. The image processor according to claim 7, wherein if the determination means determines that the generated coded image cannot be combined, the coded image generation means selectively deletes a part of information included in the coded image, and generates an adjusted coded image based on the information after the deletion, and the determination means determines whether or not the adjusted coded image can be combined into the image portion of the associated data.

10. The image processor according to claim 7, wherein each of the associated data pieces includes presentation part data as an original of an image included in the print image and non-presentation part data not included in the print image, and the coded image generation means generates the coded image by coding at least a part of the non-presentation part data.

* * * * *